April 10, 1951        R. D. WEST        2,548,247
FISHING REEL
Filed Oct. 4, 1948        2 Sheets-Sheet 1
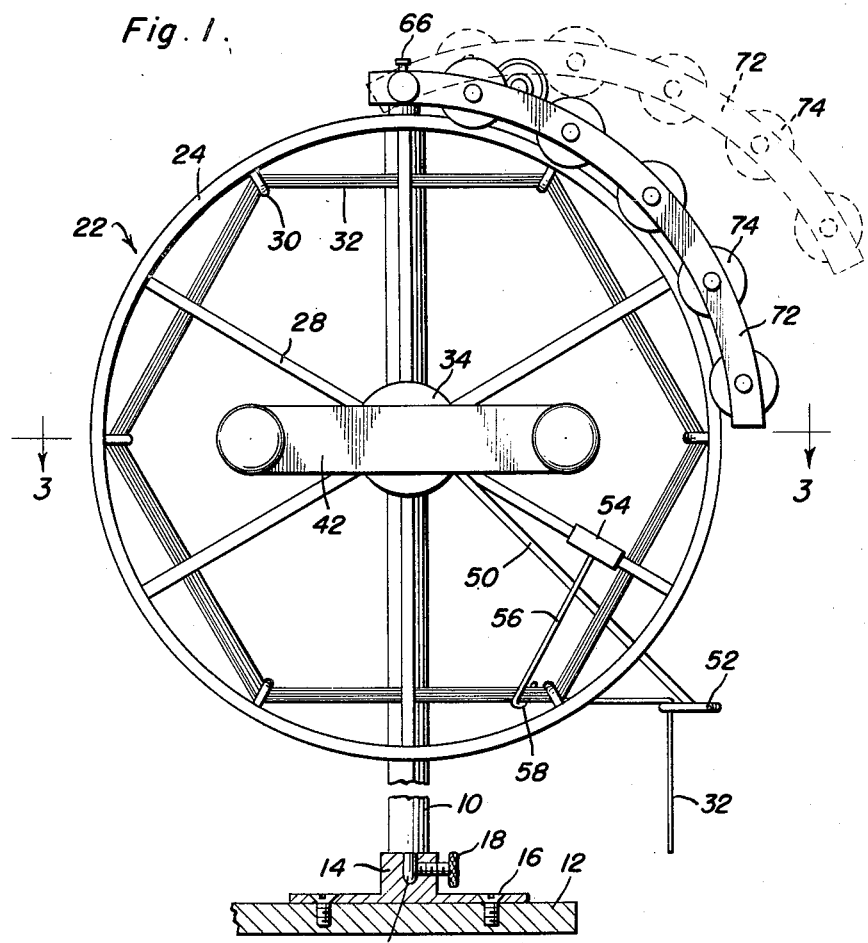
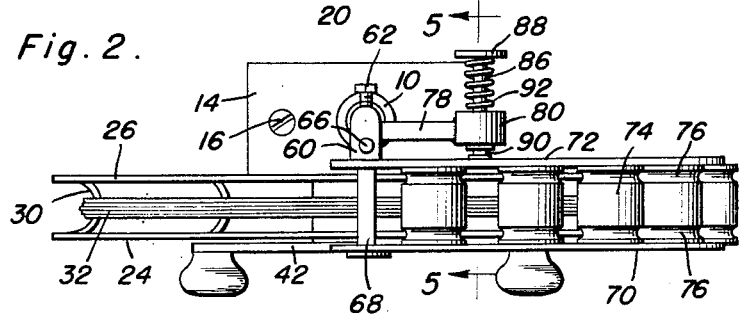
Roscoe D. West
INVENTOR.

April 10, 1951  R. D. WEST  2,548,247
FISHING REEL
Filed Oct. 4, 1948  2 Sheets-Sheet 2
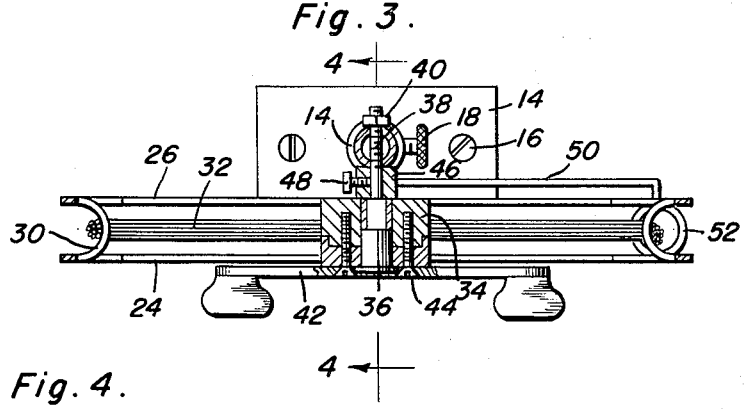
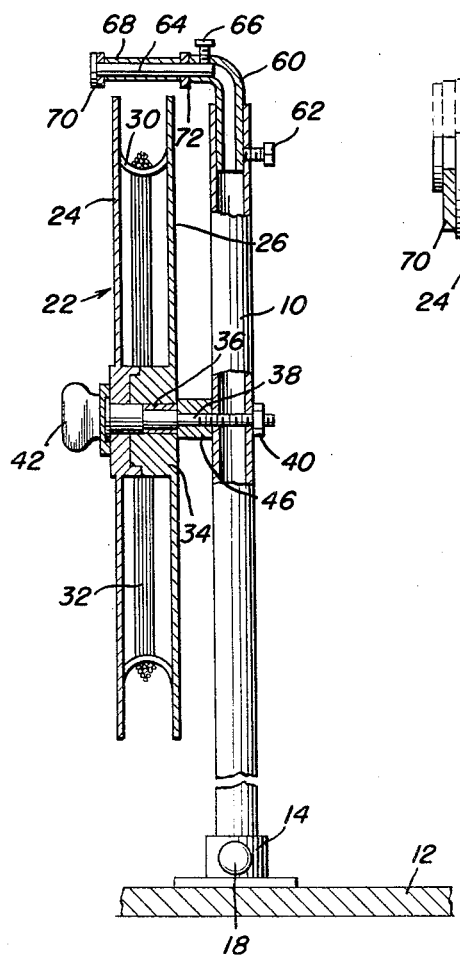
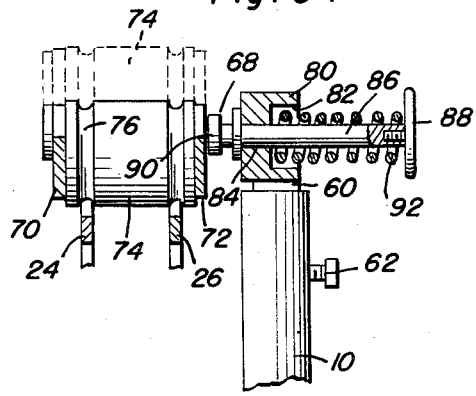
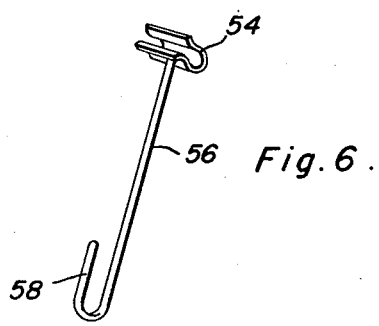
Roscoe D. West
INVENTOR.
BY Clarence A. O'Brien
and Harvey B. Jacobson
Attorneys Patented Apr. 10, 1951

2,548,247

UNITED STATES PATENT OFFICE 2,548,247

FISHING REEL

Roscoe D. West, Traverse City, Mich.

Application October 4, 1948, Serial No. 52,658

3 Claims. (Cl. 242—99)

This invention relates to improvements in fishing reels for use more particularly for fishing through holes in the ice in a shack or the like erected over the hole, although as will presently appear, the reel of my invention may be used to advantage in fishing from wharves, boats or the like.

The primary object of this invention is to provide a large sized reel that after preliminary adjustment can be manipulated to function adequately even though the operator be wearing heavy mittens.

Another object of this invention is to provide a novel fishing reel equipped with a manually operable brake for simultaneously slowing down the reel and preventing the fishing line from jumping or slipping off of the reel itself.

A further object of this invention is to provide a novel fishing reel equipped with a brake mechanism which can readily be applied to or released from the reel by means of a spring-urged plunger.

A further object of this invention is to provide a novel reel which is easily rotatable, simple and inexpensive to construct, and extremely useful for its intended purpose.

These, together with various ancillary objects and features of the invention which will later become apparent as the following description proceeds, are attained by the device, a preferred embodiment of which has been illustrated by way of example only in the accompanying drawings, wherein:

Figure 1 is a side elevational view of the reel of the instant invention, some parts being shown in section;

Figure 2 is a top plan view of the reel;

Figure 3 is a sectional view taken substantially on the plane of section line 3—3 of Figure 1;

Figure 4 is a sectional view taken substantially on the plane of section line 4—4 of Figure 3;

Figure 5 is a sectional view taken substantially on the plane of section line 5—5 of Figure 2; and Figure 6 is a perspective view of one of the line guide members.

Specific reference is now made to the drawings. In the several views in the accompanying drawings and in the following specification reference characters indicate corresponding elements throughout.

Indicated generally at 10 is a vertical standard, which is preferably of tubular construction, and which is retained upon a base 12 by means of conventional recessed screws 16. The vertical standard 10 is retained within the collar portion 14 by means of a set screw 18 extending through the collar portion and engaging at its free end a depending lug 20 secured to the vertical standard 10.

Rotatable on the vertical standard 10 is a reel generally indicated at 22 which consists of a pair of spaced circular frame members 24 and 26 which are interconnected by suitable diagonally disposed brace members 28. The two frame members 24 and 26 are secured to each other by means of circumferentially spaced U-shaped lugs 30 which retain a fishing line 32 in reeled relation thereon.

The two frame members 24 and 26 are further interconnected by means of a central hub 34 through which extends a sleeve 36. Extending through the sleeve 36 is a shaft 38 which is screw-threaded at one end and extends at this end through the vertical standard 10 and is retained upon this standard by means of an internally threaded nut 40. Secured centrally to the sleeve 36 is the conventional reel handle 42 which is in turn removably secured by means of screws 44 to the hub 34. Thus, rotation of the handle portion 42 will cause the hub 34 and associated frames 24 and 26 to rotate about the shaft 38. Removably secured to the shaft 38 intermediate the frame member 26 and the vertical standard 10 by means of a collar 46 and a set screw 48 is a rod 50 which extends beyond the periphery of the frame members 24 and 26. The free end of the rod 50 is provided with an eye 52 for guiding the fishing line 32 outside of the reel. Slidably and removably secured to one of the brace members 28 intermediate its ends is a second guide member which, as shown clearly in Figure 6, consists of a spring clip 54 which is secured at an angle thereto a rod 56 carrying a hook 58 at the free end thereof. As shown in Figure 1, the hook 58 guidingly retains the reeled fishing line 32.

As shown more clearly in Figures 2 and 4, the means for braking the reel and preventing the fishing line from slipping off the reel consists essentiall of the following structural elements. A curved pipe member 60 is removably retained upon the upper end of the vertical standard 10 by means of a screw 62. Retained within the pipe member 60 is a transversely extending shaft 64, the screw 66 being employed to fix the shaft 64 to the pipe member 60. Freely rotatable upon the shaft 64 is a sleeve member 68 to the ends of which is secured a pair of longitudinally extending, spaced parallel frame members 70 and 72. Rotatably carried upon the frame members 70 and 72 is a plurality of longitudinally spaced rollers 74, each of which rollers is provided additionally with a pair of transversely spaced annular grooves 76 so that when the frames 70 and 72 are lowered upon the reel 22 the grooves 76 will rest upon the outer peripheries of the frame members 24 and 26, as shown more clearly in Figure 5.

To affect a lowering and raising of the rollers upon the reel, a novel latch means is provided which as shown in Figures 2 and 5 consists essentially of the following structural elements.

Extending from the vertical standard 10 in parallel relationship to the frame members 70 and 72 is a support 78 which carries at its free end a cylindrical member 80 having an annular recess 82 in one surface thereof. The cylindrical member 80 is further provided with an axial bore 84 which slidably retains a plunger 86 having a head portion 88 at one end thereof. The other end of the plunger 86 carries a grooved bearing surface 90. Interposed between the head 88 and the cylindrical portion 80 about the plunger 86 and extending into the annular recess 82 is a coil spring 92. Thus, if the operator should first lift the frame members 70 and 72, and then push the plunger 86 inwardly, the bearing surface 90 will be positioned beneath the frame member 72, so that when the rollers are lowered to the position shown in solid lines in Figure 1, the frame supporting the roller will rest upon the bearing member 90 in a position elevated from the frame members 24 and 26 of the reel. Since the coil spring 92 normally urges the plunger 86 outwardly or away from the frame members 70 and 72, to lower the rollers upon the reel, all the operator has to do is merely lift the frame members 70 and 72 slightly and then let it drop whereupon the rollers will rest upon the frame members 24 and 26, in which position the rollers will act as a brake and will also prevent the fishing line 32 from slipping off the reel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing reel comprising a base member, a standard having a lower end horizontally rotatable on said base member, a pair of spaced vertically disposed circular frame members, circumferentially spaced line retaining members interconnecting said frame members, a hub centrally interconnecting said frame members, a shaft extending through said hub and secured at one of its ends to said standard, a handle carried by said hub for rotating the latter about the shaft, brake means pivotally mounted on the upper end of the standard for movement in a vertical plane and engaging the peripheries of the frame members in a lowered position, and manually operable latch means for selectively retaining said brake means in a raised and lowered position upon the frame members, said brake means including therefor an elongated arcuate frame pivoted at one of its ends to the upper end of said standard and spaced rollers carried by said arcuate frame, said rollers including spaced annular grooves for receiving the peripheries of said frame members when said arcuate frame is lowered thereupon.

2. A fishing reel comprising a base member, a standard having a lower end horizontally rotatable on said base member, a pair of spaced vertically disposed circular frame members, circumferentially spaced line retaining members interconnecting said frame members, a hub centrally interconnecting said frame members, a shaft extending through said hub and secured at one of its ends to said standard, a handle carried by said hub for rotating the latter about the shaft, brake means pivotally mounted on the upper of the standard for movement in a vertical plane and engaging the peripheries of the frame members in a lowered position, and manually operable latch means for selectively retaining said brake means in a raised and lowered position upon the frame members, said latch means including therefor a support carried by said standard and extending substantially parallel to said frame members, a collar at the free end of said support, a plunger slidable in said collar, a bearing member carried at one end of said plunger for supporting said brake means in a raised position spaced from said frame members, and resilient means normally urging said bearing member out of engagement with said brake means.

3. The combination of claim 2 wherein said bearing member includes an annular groove adapted to engage the periphery of one of said frame members when said bearing member engages and retains said arcuate frame in a raised position.

ROSCOE D. WEST.

REFERENCES CITED

The following references are of record in the file of this patent:

UNITED STATES PATENTS

| Number | Name | Date |
|---|---|---|
| 782,882 | Stolhandske | Feb. 21, 1905 |
| 986,399 | Lundin | Mar. 7, 1911 |
| 1,026,901 | Brown | May 21, 1912 |
| 1,074,553 | Maitland | Sept. 30, 1913 |
| 1,702,460 | Casey | Feb. 19, 1929 |
| 1,862,611 | Swearingen | June 14, 1932 |
| 1,878,041 | Voss | Sept. 20, 1932 |

FOREIGN PATENTS

| Number | Country | Date |
|---|---|---|
| 216,776 | Great Britain | June 5, 1924 |